(12) United States Patent
Liu

(10) Patent No.: US 9,648,135 B2
(45) Date of Patent: May 9, 2017

(54) METHOD, DEVICE, CLIENT END AND SYSTEM FOR NETWORK RESOURCE MANAGEMENT

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 338 days.

(21) Appl. No.: 14/621,553

(22) Filed: Feb. 13, 2015

(65) Prior Publication Data
US 2015/0160996 A1 Jun. 11, 2015

Related U.S. Application Data

(63) Continuation of application No. PCT/CN2013/082259, filed on Aug. 26, 2013.

(30) Foreign Application Priority Data

Aug. 30, 2012 (CN) .......................... 2012 1 0315060

(51) Int. Cl.
*H04L 29/08* (2006.01)
*G06F 11/07* (2006.01)

(52) U.S. Cl.
CPC .......... *H04L 67/34* (2013.01); *G06F 11/0709* (2013.01)

(58) Field of Classification Search
CPC ............. G06F 11/0709; H04L 41/0681; H04L 41/0686; H04L 67/34
See application file for complete search history.

(56) References Cited

U.S. PATENT DOCUMENTS

2005/0203851 A1* 9/2005 King ................ G06F 17/30067
705/51

FOREIGN PATENT DOCUMENTS

| CN | 101282366 A | 10/2008 | |
|---|---|---|---|
| CN | 101854278 A | 10/2010 | |
| CN | 101977205 A | 2/2011 | |
| DE | WO 2011138033 A1 * | 11/2011 | ............. H04L 41/12 |

OTHER PUBLICATIONS

Search Report in International Application No. PCT/CN2013/082259 dated Dec. 5, 2013.

* cited by examiner

*Primary Examiner* — Joseph Kudirka
(74) *Attorney, Agent, or Firm* — Marshall, Gerstein & Borun LLP

(57) ABSTRACT

The invention is applicable to network technologies and provides a method for network resource management, a server and a client end, which includes: receiving, an error report from a client end, wherein the error report includes a data source of a data fragment that does not pass the validation of the client; obtaining, a category of the data source; shielding, the data source when the data source belongs to a first category; and instructing, the data source to update network resources to which the data fragment belongs, when the data source belongs to a second category. The invention avoids the situation that the client end is unable to download a complete file due to an error of an original source of network resources, and improves the success rate of downloading.

6 Claims, 4 Drawing Sheets

METHOD, DEVICE, CLIENT END AND SYSTEM FOR NETWORK RESOURCE MANAGEMENT

The present application is a continuation of International Application No. PCT/CN2013/082259 filed on Aug. 26, 2013, which claims the benefit of Chinese Patent Application No. 201210315060.3 filed on Aug. 30, 2012. The disclosure of each of the above applications is hereby incorporated in its entirety by reference.

FIELD OF THE DISCLOSURE

The present invention relates to network technologies, and more particularly, to a method, a device, a client end and a system for network resource management.

BACKGROUND

A technology of peer to server and peer (P2SP) utilizes a third-party server and a data source of a peer-to-peer (P2P) network, so that a download process does not merely rely on a source server of internet service provider (ISP). Data may be transferred either between various terminals in the network or between a terminal and a server. Compared with a traditional download method of peer to server (P2S) or P2P and so on, download stability and download speeds of P2SP has been greatly improved.

In the P2SP technology, because the data comes from different data sources, in order to guarantee accuracy of a download result, each data fragment needs to be validated by fragment validation information provided by the source server. When there is an error in the validation result, client end only selects to perform the download from the source server, and gives up multisource downloading from other nodes. However, the data source provided by the source server may go wrong. Take content delivery network (CDN) as an example, it can be the case that content distribution of each node is non-synchronous or cache content is not updated in time. In the above case, even though a user downloads data from the source server, a data fragment cannot be downloaded correctly, which may lead to an issue that an entire file is still unable to be downloaded completely.

SUMMARY

An embodiment of the present invention is implemented by a method for network resource management which includes:

receiving, by a server, an error report from a client end, wherein the error report includes a data source of a data fragment that does not pass the validation of the client;

obtaining, by the server, a category of the data source;

shielding, by the server, the data source when the data source belongs to a first category; and instructing, by the server, the data source to update network resources to which the data fragment belongs, when the data source belongs to a second category.

Another object of the embodiments of the present invention is to provide a device for network resource management which includes:

a first receiving unit, configured to receive an error report from a client end, wherein the error report comprises a data source of a data fragment that does not pass the validation of the client;

an obtaining unit, configured to obtain a category of the data source;

a first shielding unit, configured to shield the data source when the data source belongs to a first category; and an instructing unit, configured to instruct the data source to update network resources to which the data fragment belongs, when the data source belongs to a second category.

Another object of the embodiments of the present invention is to provide a client end which includes:

a downloading unit, configured to download a data fragment from a data source instructed by a server end; and a sending unit, configured to send an error report to the server end when the data fragment does not pass the validation, wherein the error report comprises a data source, to enable the server end to obtain a category of the data source according to the data source comprised in the error report, to shield the data source or indicate the data source to perform an update.

DETAILED DESCRIPTION

In order to make the object and technical solution of the present invention clearer, a detailed description of the present invention is hereinafter given with reference to the attached drawings and embodiments. It should be understood that the embodiments are illustrative and that the invention scope is not so limited.

In the embodiments of the present invention, by receiving an error report that is reported by a client end during a process of P2SP downloading, a server end determines which category of a data source a data fragment belongs to, whose validation result is an error, to further shield the data source or instruct the data source to perform an update, which avoids the situation that the client end is unable to download a complete file due to an error of original source of network resources, and improves the success rate of downloading.

Figure 1:
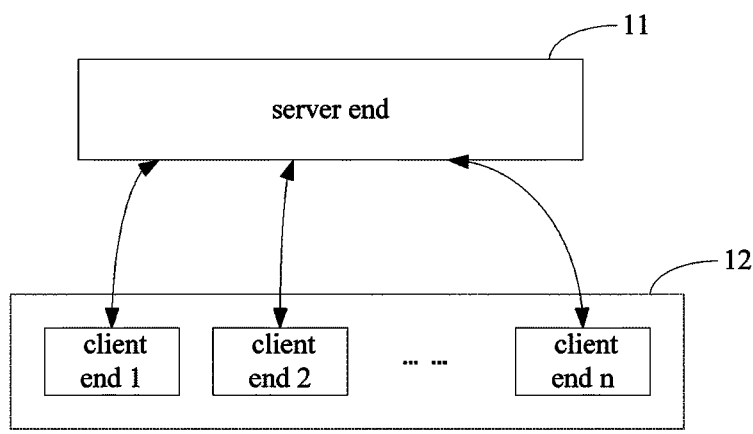
FIG. 1 is an architecture block diagram of a system for network resource management provided by an embodiment of the present invention.

FIG. 1 illustrates an architecture block diagram of a system for network resource management provided by an embodiment of the present invention. For illustrative purposes, only relevant parts of the embodiment are shown.

Referring to FIG. 1, based on the system architecture of the client end and the server end, the system includes server end 11 and at least one client end 12 that are communicated via a network, and the server end 11 may be a server system that consists of multiple different function servers.

In the P2SP technology, a file is divided into several data fragments with a predetermined size, and the data fragments of the file need not be downloaded in order, so a user may download different data fragments of same network resources from multiple physic nodes at the same time. In the embodiment of the present invention, for example, when a client end 1 needs to download a file, a uniform resource locator (URL) of the file is obtained from a relevant resource website first; related information, such as multiple data sources of the file and fragment validation information of each data fragment, is obtained from the server end 11 by the URL; and at the beginning, the different data fragments are downloaded from multiple data sources provided by the server end 11. During the downloading process, the client end 1 will share the downloaded fragments with other client end by the server end 11, so that the other client end may download corresponding data fragments from the client 1. In the above process, one of important functions of the server end 11 is network resource management, and an original isolated server, a mirror resource and a P2P resource are effectively combined together, enabling each client end 12 to obtain correct data source information and finish multi-source downloading.

Figure 2:
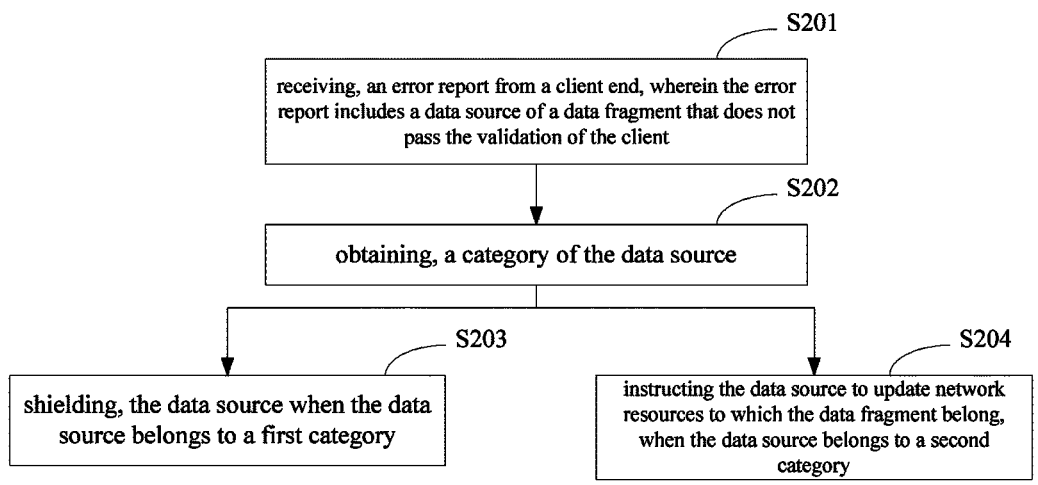
FIG. 2 is a realization flowchart of a server end of a method for network resource management provided by an embodiment of the present invention.

FIG. 2 illustrates a realization flowchart of a method for network resource management provided by an embodiment of the present invention. In the embodiment, an executive body of the flow is the server end 11 shown in FIG. 1. Details are as below:

In step S201, receiving, an error report from a client end, wherein the error report includes a data source of a data fragment that does not pass the validation of the client.

The client end downloads network resources in P2SP in accordance with multiple data sources provided by the server, and after each download of a data fragment, the client end will calculate a validation value of the data fragment (such as a hash value), and then compare the calculated validation value with fragment validation information of the data fragment provided by the server end, and determine whether the data fragment is received correctly. When the data fragment is received correctly, data fragment passes the validation.

In the embodiment, when the data fragment downloaded by the client does not pass the validation, the client will send the error report to the server end, wherein the error report includes a data source of the data fragment, such as an address of the data source, enabling the server end to know the data source which sends the data fragment that has passed the validation. Further, the error report may also include fragment information such as an original source of the data fragment, a size of the data fragment, a validation value, and so on.

In step S202, obtaining, a category of the data source.

As an embodiment of the present invention, the server end, according to the address of the data source, may determine the data source is from an internet service provider (ISP), a third-party server or a P2P network node.

As another embodiment of the present invention, before each data source provides the client end with a download, the network resources that it can provide needs to be registered in the server end first, related information of the network resources is stored in a data base, and all the data sources of the network resources are counted and managed by the server, so as to provide the download for the client end. Therefore, when the network resources are put in storage, the server end, according to the data source that provides the network resources, determines the category of the data source. After associating the data source with the category, the category of the data source is stored into the data base of the server end.

In the embodiment, categories of the data source may include a first category and a second category. The first category may be an operation data source, that is, the data source, as an ISP, takes a downloading platform of P2SP as a release channel of digital media content, which initiatively releases network resources including a software, a game installation package, a system patch, a video file, and so on; and the second category may be non-operation data source, including the third-party server providing the network resources which is captured by the server end from internet through a crawler system, or the node having network resource in the P2P network, etc.

Therefore, in step S202, the server end, in accordance with the data source of the error report reported by the client end, may find the category of the data source in the data base where the related information of the network resources is stored.

As an embodiment of the present invention, when the server end associates the data source with its corresponding category and stores it into the database, the data source and its corresponding category may be sent to the client end, so that when the client end finds there is a data fragment that does not pass the validation and the data fragment belongs to the first category, the client shields the data source to prevent the client end from downloading the network resources from the data source.

In step S203, shielding, the data source when the data source belongs to a first category.

In the embodiment, when the server end determines that the data source belongs to the first category, namely, the operation data source, the server end shields the data source, and later when a data source of network resources is provided for other client, the data source will not be sent to the client end, so as to prevent the incorrect data source from continuing to provide the client end with an incorrect data fragment, that is, to prevent the client end from downloading the incorrect data fragment from the data source.

In step S204, instructing, the data source perform to update network resources to which the data fragment belong, when the data source belongs to a second category.

Usually, as for a data source of the second category, that is, a non-operation data source, a link that remains constant often exits on the internet, but network resources corresponding to the link changes. For example, when software is released, the download link has been published, but a bug is found in the software in a prior period of releasing, at this point, the file corresponding to the download link will be replaced directly instead of updating with the download link. In such a case, when the client end still downloads by adopting the same download link, the validation value of the downloaded data fragment will be different with the fragment validation previously provided by the server end and the validation is not successful, which leads that an entire file is still unable to be downloaded completely.

Therefore, in the embodiment, when the server end determines the data source belongs to the second category, that is, the non-operation data source, the server end emits an instruction, to instruct the data source to update the network resources to which the data fragment belongs. At the same time, after the data source updates the network resources, the related information of the network resources in the server end, including fragment validation information of the network resources, needs to be synchronously updated.

Figure 3:
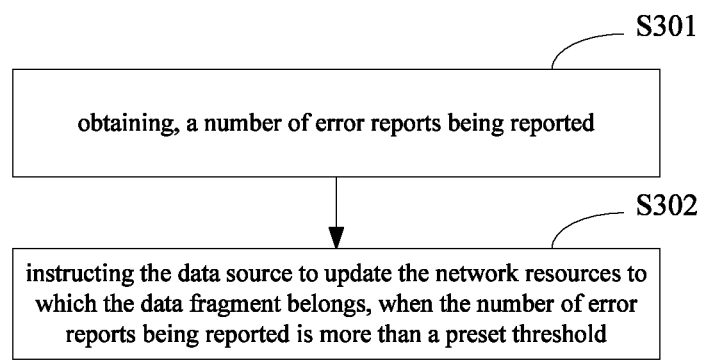
FIG. 3 is a flowchart for realizing step S204 of a method for network resource management at a server end provided by an embodiment of the present invention.

Further, as an embodiment of the present invention, as shown in FIG. 3, step S204 specifically is:

In step S301, obtaining, a number of error reports being reported.

In step S302, instructing, the data source to update the network resources to which the data fragment belongs, when the number of the error reports being reported is more than a preset threshold.

In the embodiment, further, after the error report is received and before the number of the error reports being reported is obtained, the number of the error reports being reported is updated. That is, an increase in the number of the error reports being reported is 1, so as to keep track of the number of the error reports being reported related to some data source. When the number of the error reports being reported that includes the data source reaches a preset threshold, the server end instructs the data source to update its corresponding network resources. Thus, the client end will not download without a stable data source because the server end frequently changes the related validation information.

In the embodiment of the present invention, by receiving the error report that is reported by the client end during a process of P2SP downloading, the server end determines which category of the data source the data fragment belongs to, whose validation result is an error, to further shield the data source accordingly or perform an update process, which avoids the situation that the client end is unable to download a complete file due to an error of an original source of network resources, and improves the success rate of downloading.

Figure 4:
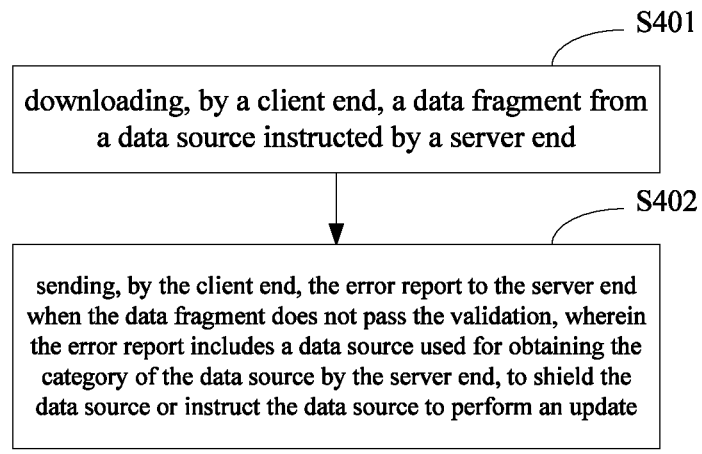
FIG. 4 is a realization flowchart of a client end of a method for network resource management provided by an embodiment of the present invention.

FIG. 4 illustrates a realization flowchart of a method for network resource management provided by an embodiment of the present invention. In the embodiment, an executive body of the flow is the client end 12 shown in FIG. 1. Details are as below:

In step S401, downloading, by a client end, a data fragment from a data source instructed by a server end.

In the embodiment, the client end, according to the data source instructed by the server end, downloads the data fragment of corresponding network resources, validates the data fragment after downloading the data fragment, compares the validated result with the fragment validation information provided by the server end, and determines whether the data fragment passes the validation.

In step S402, sending, by the client end, the error report to the server end when the data fragment does not pass the validation, wherein the error report includes a data source of the data fragment that passes the validation, enable the server end to obtain the category of the data source according to the data source included in the error report to shield the data source or instruct the data source to perform an update.

Further, before the step S401, the client end receives the data source sent by the server end, to download data from the data source, at the same time, and also receives the category of the data source from the server end. When the data fragment which is downloaded by the client end from the data source does not pass the validation, the client end may determine whether the category of the data source belongs to the first category; and when the data source belongs to the first category, the client end shields the data source in its own side, and no longer downloads the network resources from the data source.

Because the method for network resource management described in the embodiment of FIG. 4 of the present invention is based on a same realization principle of that described in the embodiments of FIGS. 2 and 3 of the present invention, and just the former is described by taking the client end as the executive body and the latter is described by taking the server end as the executive body, the embodiments described in FIGS. 2 and 3 may be referred to as the relevant realization principle which will not be described redundantly herein.

Figure 5:
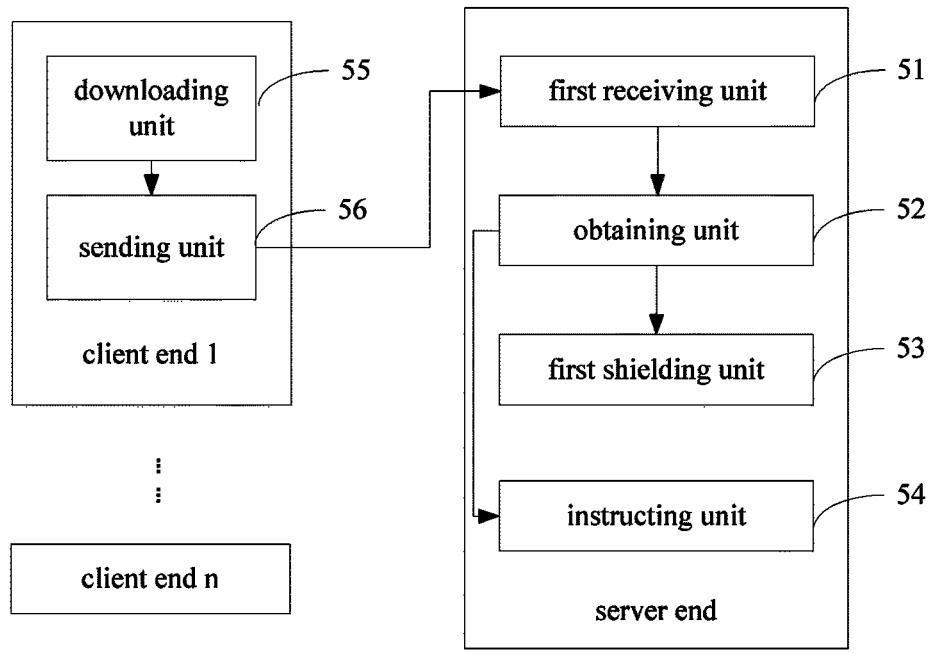
FIG. 5 is a structure diagram of a device for network resource management provided by an embodiment of the present invention.

FIG. 5 illustrates a structure diagram of a device for network resource management provided by an embodiment of the present invention. For illustrative purposes, only relevant parts of the embodiment are shown. As shown in FIG. 5, the device for network resource management runs on the network resource management system shown in FIG. 1, and is placed on a server end or at least one client end. On the server end side, each device may be placed in a same server, and different units may be distributed on different function servers (such as a resource indexing server, a storage management server, a statistics server or a P2P tracker server), to realize different module functions.

In the server end, it includes:

a first receiving unit 51, configured to receive an error report from a client end, wherein the error report includes a data source of a data fragment that does not pass the validation of the client;

an obtaining unit 52, configured to obtain a category of the data source;

a first shielding unit 53, configured to shield the data source when the data source belongs to a first category; and an instructing unit 54, configured to instruct the data source to update network resources to which the data fragment belongs, when the data source belongs to a second category.

Further, in the server end, the device also includes:

a sending unit, to send the data source and the category of the data source to the client end, enabling the client end to shield the data source when the client end determines the data source belongs to the first category according to the category.

Further, the indicating unit 54 includes:

an obtaining subunit, to obtain a number of error reports being reported; and an instructing subunit, to instruct the data source to update the network resources to which the data fragment belongs, when the number of error reports being reported is more than a preset threshold.

In the client end, it includes:

a downloading unit 55, to download a data fragment from a data source instructed by a server end; and a sending unit 56, to send an error report to the server end when the data fragment does not pass the validation, wherein the error report includes a data source that does not pass the validation, to enable the server end, according to the data source included in the error report, to obtain a category of the data source, so as to shield the data source or instruct the data source to perform an update.

Further, it also includes:

a second receiving unit, to receive the data source and the category of the data source sent by the server end; and a second shielding unit, to shield the data source when the data fragment does not pass the validation and the data source belongs to a first category.

Figure 6:
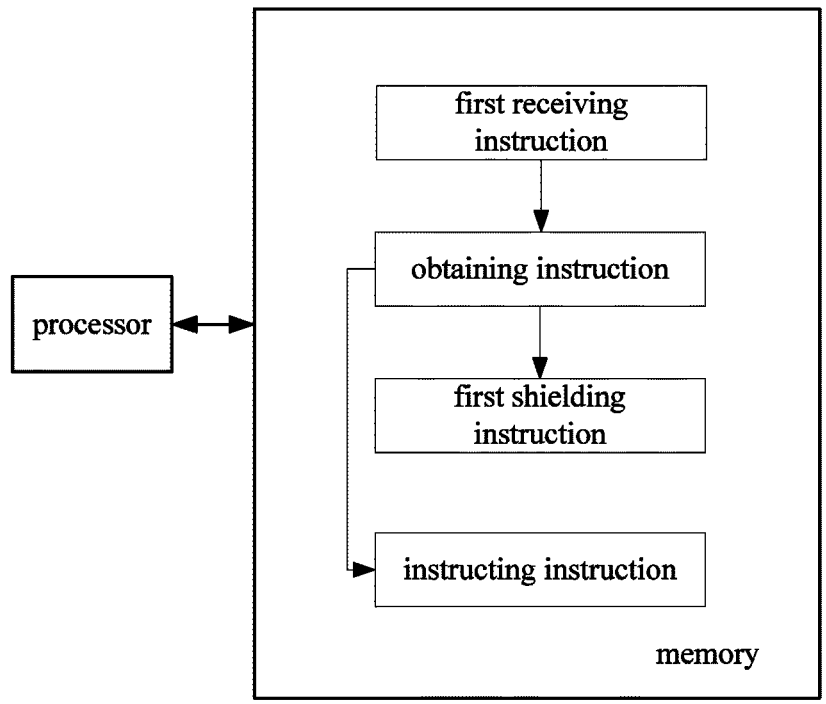
FIG. 6 is a structure diagram of a server provided by an embodiment of the present invention.

FIG. 6 is a structure diagram of a server provided by an embodiment of the present invention. As shown in FIG. 6, the server at least includes a memory and a processor connected with the memory, wherein instructions included in the memory may be executed by the processor. When the instructions are executed, various functions in the aforementioned embodiments may be realized by the server. In an embodiment, the memory may stores a first receiving instruction, an obtaining instruction, a first shielding instruction and an instructing instruction shown in FIG. 6.

When the first receiving instruction is executed, the server receives an error report of a client end, wherein the error report includes a data source of a data fragment that does not pass the validation of the client.

When the obtaining instruction is executed, the server obtains a category of the data source.

When the first shielding instruction is executed, the server shields the data source when the data source belongs to a first category When the instructing instruction is executed, the server instructs the data source to update network resources to which the data fragment belongs, when the data source belongs to a second category.

Further, in the sever end, the device also includes a sending instruction.

When the sending instruction is executed, the server sends the data source and the category of the data source to the client end, enabling the client end to shield the data source when the client end determines the data source belongs to the first category according to the category.

Further, the indicating instruction includes an obtaining instruction and a second instructing instruction.

When the indicating instruction is executed, the server obtains a number of error reports being reported.

When the second indicating instruction is executed, the server instructs the data source to update the network resources to which the data fragment belongs, when the number of error reports being reported is more than a preset threshold.

Figure 7:
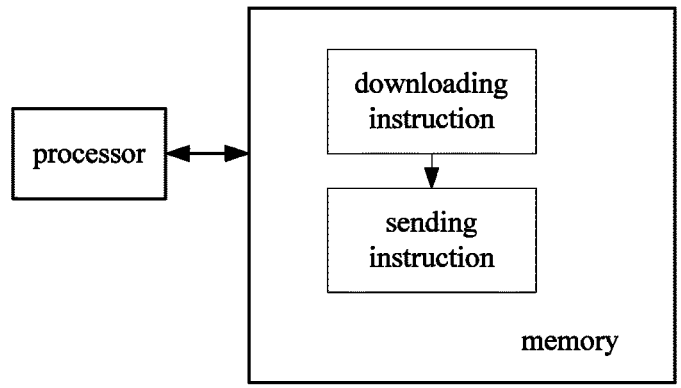
FIG. 7 is a structure diagram of a client end provided by an embodiment of the present invention.

FIG. 7 is a structure diagram of a client end provided by an embodiment of the present invention. As shown in FIG. 7, the client end at least includes a memory and a processor connected with the memory, wherein instructions included in the memory may be executed by the processor. When the instructions are executed, various functions in the aforementioned embodiments may be realized by the client end. In an embodiment, the memory may store a downloading instruction and a sending instruction shown in FIG. 7.

When the downloading instruction is executed, the client end downloads a data fragment from a data source instructed by a server end.

When the sending instruction is executed, the client end sends an error report to the server end when the data fragment does not pass the validation, wherein the error report includes a data source that does not pass the validation, to enable the server end, according to the data source included in the error report, to obtain a category of the data source, so as to shield the data source or instruct the data source to perform an update.

Further, a second receiving instruction and a second shielding instruction are also included.

When the second receiving instruction is executed, the client end receives the data source and the category of the data source sent by the server end.

When the second shielding instruction is executed, the client end shields the data source when the data fragment does not pass the validation and the data source belongs to a first category.

Figure 8:
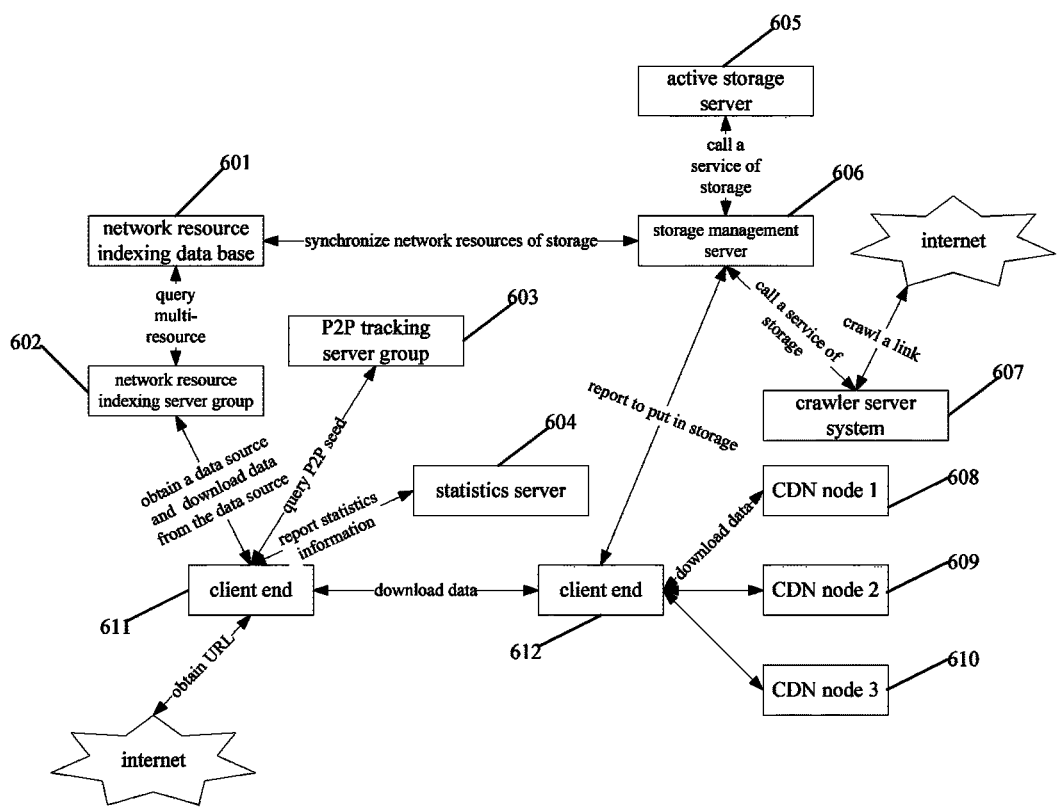
FIG. 8 is a schematic diagram illustrating the principle of a method for network resource management provided by an embodiment of the present invention.

As an implementation example of the present invention, FIG. 8 is a diagram illustrating the principle of a method for network resource management provided by an embodiment of the present invention, when each device of FIG. 5 is distributed on different function servers. As shown in FIG. 8, a network resource management system includes a network resource indexing data base 601, a network resource indexing server group 602, a P2P tracking server group 603, a statistics server 604, an active storage server 605, a storage management server 606, a crawler server system 607, a CDN node 1 608, a CDN node 2 609, a CDN node 3 610, a client end 611 and a client end 612. The client end 611 obtains a data source from the network resource indexing server group 602, and downloads the data from the data source, wherein the data source may be the client end 612, the CDN node 1 608, the CDN node 2 609 or the CDN node 3 610. The client end 611 sends an error report to the network resource indexing server group 602, wherein the error report includes a data source of a data fragment that does not pass the validation of the client. The network resource indexing server group 602 obtains a category of the data source, and shields the data source or instructs the data source to update the network resources to which the data fragment belongs.

It can be easily seen from the FIG. 8 that, in the network resource management method provided by the embodiment of the present invention, the data source where a source error occurred is shield by the server end or the data source is instructed to perform an update by the server, which avoids the situation that the client end is unable to download a complete file due to an error of an original source of network resources, and improves the success rate of downloading.

The above are only preferred embodiments of the present invention, but not to limit the protection scope of the present invention. Where the spirit of the present invention, within the principles of any changes made, variations or equivalent replacements, etc. shall be included in the protection scope of the present invention.

What is claimed is:

1. A method for network resource management, comprising:
    receiving, by a server, an error report from a client end, wherein the error report comprises a data source of a data fragment that does not pass validation of the client end;
    obtaining, by the server, a category of the data source;
    shielding, by the server, the data source when the data source belongs to a first category; and
    instructing, by the server, the data source to update network resources to which the data fragment belongs, when the data source belongs to a second category.

2. The method of claim 1, wherein instructing, by the server, the data source to update network resources to which the data fragment belongs comprises:
    obtaining, by the server, a number of error reports being reported; and
    instructing, by the server, the data source to update the network resources to which the data fragment belongs, when the number of error reports being reported is more than a preset threshold.

3. A server, comprising a memory and a processor, wherein the memory stores instructions executable for the processor, and the instructions of the memory are stored in a plurality of units comprising:
    a first receiving unit, configured to receive an error report from a client end,
    wherein the error report comprises a data source of a data fragment that does not pass validation of the client end;

an obtaining unit, configured to obtain a category of the data source;

a first shielding unit, configured to shield the data source when the data source belongs to a first category; and an instructing unit, configured to instruct the data source to update network resources to which the data fragment belongs, when the data source belongs to a second category.

4. The device of claim 3, wherein the instructing unit comprises:

an obtaining subunit, configured to obtain a number of error reports being reported;

an instructing subunit, configured to instruct the data source to update the network resources to which the data fragment belongs, when the number of error reports being reported is more than a preset threshold.

5. A client end, comprising a memory and a processor, wherein the memory stores instructions executable for the processor, and the instructions of the memory are stored in a plurality of units comprising:

a downloading unit, configured to download a data fragment from a data source instructed by a server end; and a sending unit, configured to send an error report to the server end when the data fragment does not pass validation, wherein the error report comprises a data source which enables the server end to obtain a category of the data source according to the data source comprised in the error report, the category indicating to shield the data source or to instruct the data source to perform an update.

6. The client end of claim 5, further comprising:

a second receiving unit, configured to receive the category of the data source sent by the server end; and a second shielding unit, configured to shield the data source when it is determined that the data source belongs to a first category according to the category of the data source obtained from the server end.

* * * * *